Dec. 24, 1968   L. E. BROBERG   3,417,880
UNLOADING MECHANISM FOR A STORAGE STRUCTURE
Filed Oct. 24, 1965   3 Sheets-Sheet 1
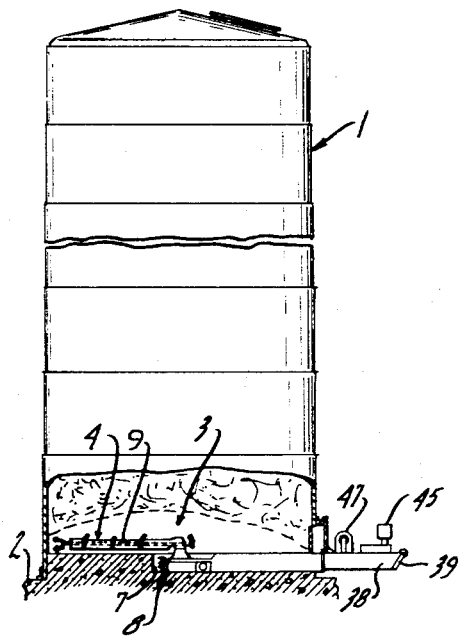
Fig. 1
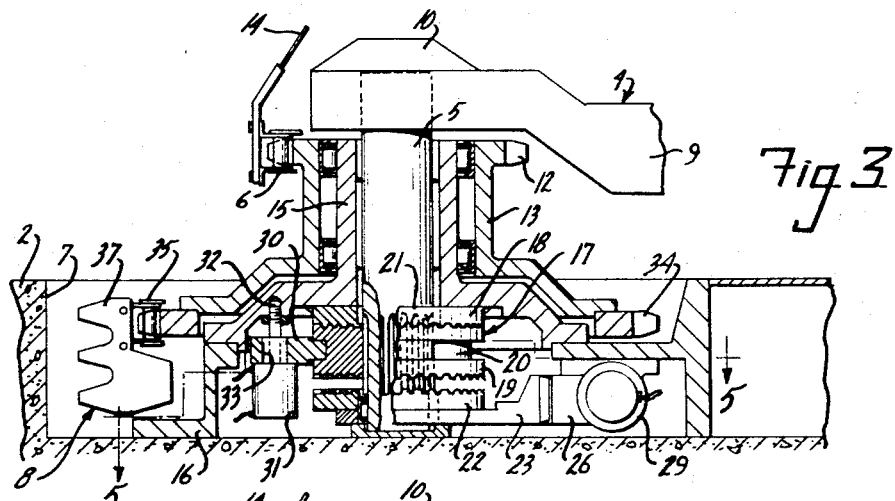
Fig. 3
Fig. 4
INVENTOR
LEONARD E. BROBERG
BY
Andrus & Starke
Attorneys Dec. 24, 1968     L. E. BROBERG     3,417,880
UNLOADING MECHANISM FOR A STORAGE STRUCTURE
Filed Oct. 24, 1965     3 Sheets-Sheet 2
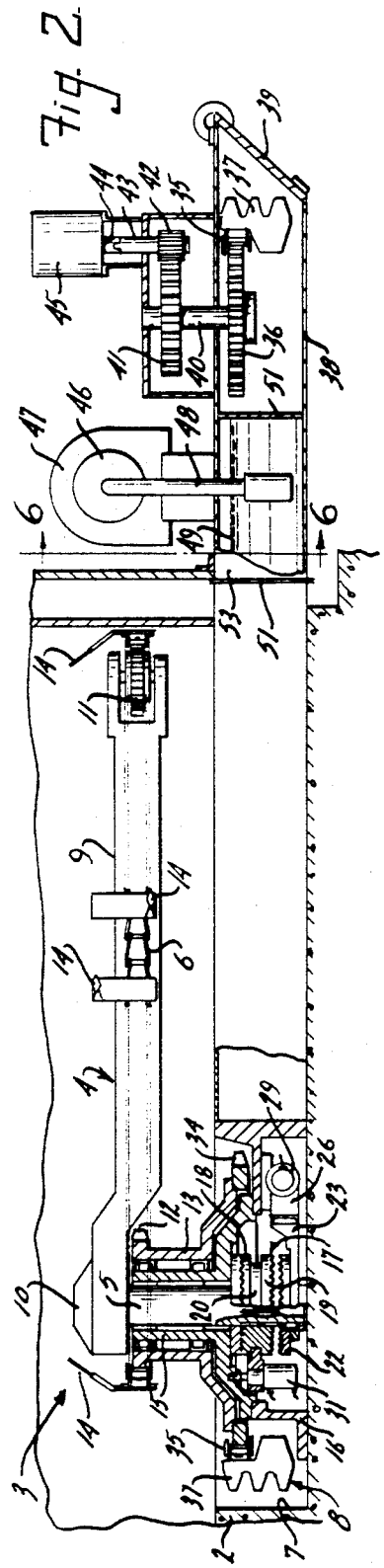
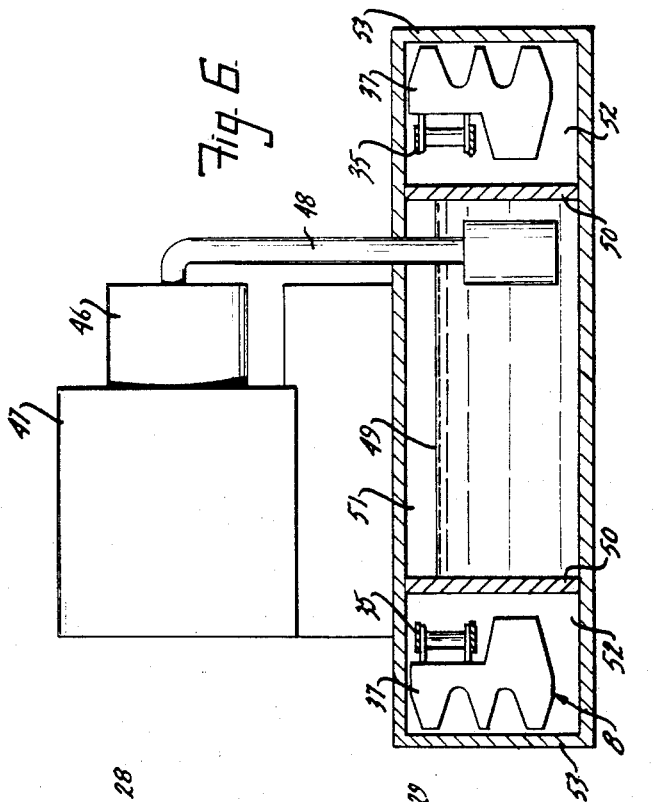
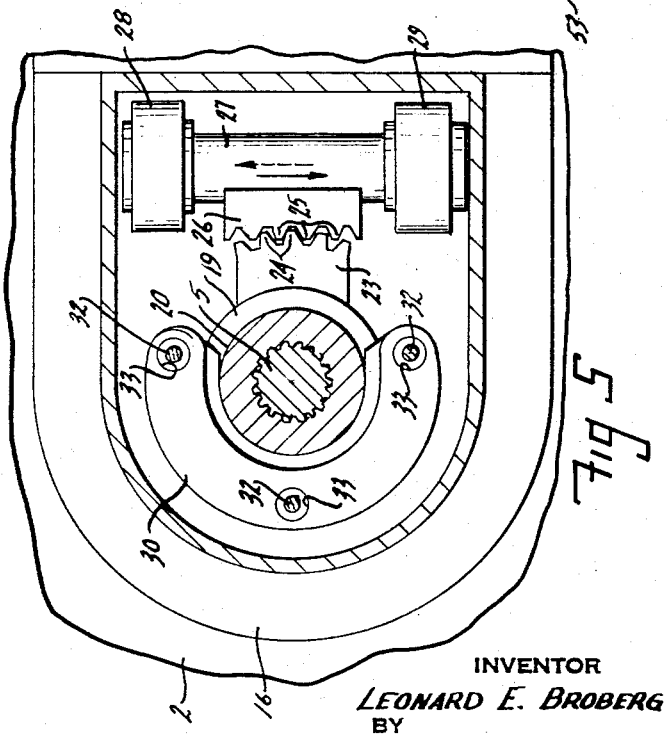
INVENTOR
LEONARD E. BROBERG
BY
Andrus & Starke
Attorneys

# United States Patent Office 3,417,880
Patented Dec. 24, 1968

3,417,880
UNLOADING MECHANISM FOR A
STORAGE STRUCTURE
Leonard E. Broberg, Milwaukee, Wis., assignor to A. O.
Smith Harvestore Products, Inc., Arlington Heights, Ill.,
a corporation of Delaware
Filed Oct. 24, 1965, Ser. No. 504,541
16 Claims. (Cl. 214—17)

ABSTRACT OF THE DISCLOSURE

The invention relates to an improved hydraulic unloading mechanism for a sealed storage structure. The unloading mechanism includes a cutter arm which is journaled for rotation about a vertical axis at the center of the structure and the cutter arm carries an endless cutter chain which dislodges the stored material and delivers it to the center of the silo where it falls into a radially extending trough formed in the foundation. A conveyer mechanism operating within the trough conveys the dislodged material to the exterior of the structure. The conveyor and the cutter chain are driven by a hydraulic motor which is located on the exterior of the structure and is operably connected to the conveyor. To rotate the cutter arm about the structure, a pair of drive cylinders having a common piston are located within the trough adjacent the center of the silo. The piston carries a rack which engages a gear segment journaled on the central shaft or post. By moving the piston in one direction the segment and the cutter arm are rotated through an arc or increment, and a clutch mechanism is included which disengages the rack from the gear segment when the piston member is moved in the opposite direction. The hydraulic drive mechanism is designed so that the speed of the material dislodging member varies with the load conditions so that under light loads the unloading mechanism will operate at higher speeds.

---

This invention relates to a storage structure and more particularly to an unloading mechanism for removing stored material from a sealed storage structure such as a silo.

Perishable materials such as silage are frequently stored in a sealed vessel or silo to minimize spoilage. As the silo is sealed to the atmosphere, a bottom unloading mechanism is normally employed to undercut and remove the silage, as disclosed in U.S. Patent 2,635,770 to Tiedemann. The conventional unloading mechanism includes a cutter arm which is journaled for rotation about a vertical axis at the center of the silo and the cutter arm carries an endless cutter chain which dislodges and moves the silage toward the center of the silo where it falls into a radially extending trough formed in the foundation. A conveying mechanism operates within the trough to convey the dislodged silage to the exterior of the silo.

In the conventional unloading mechanism, a motor is located on the exterior of the silo and operates through a mechanical drive system located in the trough to rotate the cutter arm around the silo. In addition, the motor drives a sprocket which carries the conveyor chain and the conveyor chain is operably connected to the cutter chain so that the movement of the conveyor chain acts to drive the cutter chain in its endless path on the rotating cutter arm.

During the unloading operation, various load conditions may be encountered due to localized areas of hard packed silage. In the conventional unloading mechanism there is no provision for adjusting the speed of rotation of the cutter arm, nor for adjusting the speed of the cutter chain, under varying load conditions.

Moreover, with the conventional unloading mechanism, the cutter arm can be power rotated only in one direction and it is generally possible to reverse or back up the cutter arm only by manual operation in order to clean out areas of jammed or hard packed silage ahead of the arm.

The present invention is directed to an improved unloading mechanism for a sealed storage structure which incorporates a hydraulic drive system. According to the invention the drive includes a reservoir for hydraulic fluid and a pump operates to supply the hydraulic fluid under pressure to a hydraulic motor which drives the conveyor chain. The conveyor chain is connected in a conventional manner to the cutter chain to thereby drive the cutter chain in an endless path on the cutter arm.

To rotate the cutter arm about the silo, a pair of drive cylinders having a common piston are located within the radial trough adjacent the center of the silo. The piston carries a rack which engages a gear segment journalled on the central shaft or post. By introducing hydraulic fluid into the cylinder, the piston is moved in one direction which serves to rotate the gear segment through a small arc or increment.

A clutch mechanism is included in the drive for the cutter arm and comprises a clutch collar which is keyed to the central post. When the clutch collar is engaged with the gear segment, the post will rotate with the gear segment, and when the clutch collar is engaged with a fixed clutch plate secured to the base casting of the unit the post will be locked against rotational movement. In addition, the clutch collar can be located in the central or neutral position in which the cutter arm and post are freely journalled and the cutter arm can be manually moved, if so desired.

In operation, the clutch collar is engaged with the gear segment and on movement of the gear segment the post will be rotated through a small arc. A clutch cylinder then disengages the clutch collar and moves it to the locked position so that the post and cutter arm will then be locked against movement. While the cutter arm is locked against movement, the drive piston is returned to its original position. The clutch cylinder then moves the clutch collar into engagement with the gear segment, so that on movement of the drive piston the gear segment will be rotated through a second arc which in turn will rotate the central post and the cutter arm. This procedure is repeated to slowly rotate the cutter arm around the silo in a series of steps or increments.

By use of the hydraulic drive system, the speed of the cutter chain is automatically varied with changes in the load.

As a further advantage, the hydraulic drive system has a reduced starting torque requirement over that of the conventional mechanical drive system. Normally, an electric motor, specifically designed for high starting torque, is used in the mechanical unloader, as the load has to be picked up immediately. With the hydraulic drive system, the high torque starting characteristics are not required and a standard motor can be used.

The hydraulic drive system will provide a longer service life than a mechanical system due to the cushioning effect provided by the hydraulic drive. Moreover, the hydraulic drive will reduce shock loads and this is an important factor in that shock loads which are encountered in unloading silage or other hard packed materials cause rapid fatiguing of the drive elements.

The hydraulic drive system is capable of increased delivery due to the fact that under light loads the mechanism can operate at higher speeds. As a mechanical unloader operates at a constant speed which is normally set for heavy load conditions, the mechanical unloader cannot take advantages of light load conditions to increase the speed of delivery. However, with the present invention, the speed of travel of the cutter chain is increased under light load conditions so that overall, the delivery is improved.

As a further advantage, the hydraulic drive system has increased flexibility in that the cutter arm can be power rotated both clockwise and counterclockwise. This is a distinct advantage in that it permits the cutter arm to back up and the area behind the cutter arm can be cleaned out. Furthermore, the cutter chain can be operated in the reverse direction, so that the area in front of the chain can be cleaned out, if necessary, under heavy load conditions.

Still another advantage of the hydraulic drive system is design simplification in that it eliminates the expensive bevel gear sets, shafts and bearings which are present in the mechanical drive system. Furthermore, the hydraulic drive system reduces the maintenance costs as there are fewer mechanical parts exposed to corrosion and wear.

Other objects and advantages will appear in the course of the following description.

The drawings illustrate the best mode presently contemplated of carrying out the invention.

In the drawings:

FIG. 1 is a side elevation of a silo with parts broken away in section and incorporating the unloading mechanism of the invention;

FIG. 2 is an enlarged vertical section showing the unloading mechanism and hydraulic drive;

FIG. 3 is an enlarged vertical section of the central drive shaft and illustrating the clutch mechanism in the locked position;

FIG. 4 is a view similar to FIG. 3 showing the clutch mechanism in the engaging or driving position;

FIG. 5 is a horizontal section taken along line 5—5 of FIG. 3;

FIG. 6 is a vertical section taken along line 6—6 of FIG. 2; and

Figure 7:
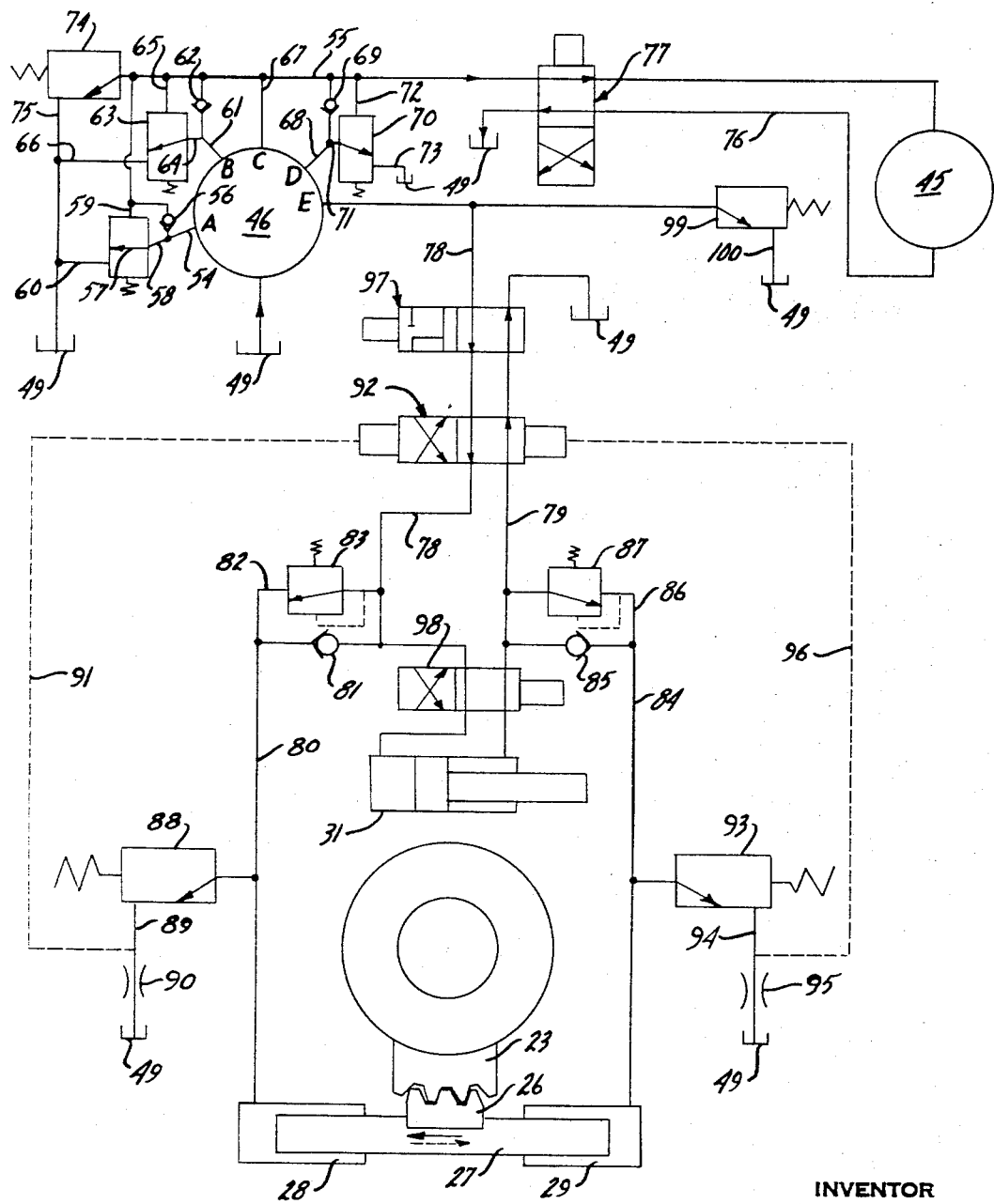
FIG. 7 is a diagrammatic view of the hydraulic system.

The drawings illustrate a silo or storage structure 1 which is adapted to contain a stored material such as silage, haylage or the like. The silo 1 is supported on a foundation 2 and an unloading mechanism 3 is mounted on the foundation and is adapted to undercut and dislodge the stored material and move it to the exterior of the silo.

The unloading mechanism 3 in general includes a cutter arm 4 which is journaled for rotation about a central shaft 5 located at the center of the silo and a cutter chain 6 is mounted for endless travel on the cutter arm and acts to undercut the silage and move the dislodged silage to the center of the silo where it falls within a radially extending trough 7 formed in the foundation 2. A conveying mechanism 8 operates within the trough to move the dislodged silage to the exterior of the silo.

As best shown in FIG. 2 the cutter arm 4 includes an elongated beam 9 which is connected at its inner end to a hub 10 secured to the upper end of the central shaft 5. The outer end of the beam 9 is split and carries a sprocket 11 while a second sprocket 12 is secured to an outer sleeve 13 which is located concentrically about the central shaft 5. The cutter chain 6 is engaged with the sprockets 11 and 12 and moves in an endless path on the cutter arm. To dislodge the silage or other stored material, a series of cutter teeth 14 are secured to the chain 6 and serve to penetrate and dislodge the silage and move the dislodged silage toward the center of the silo.

The outer sleeve 13 is journaled for rotation about an inner sleeve 15 which in turn is journaled about the central shaft 5. The lower end of the inner sleeve 15 is attached to a base casting 16 mounted within the inner end of the trough 7 at the center of the silo.

As previously mentioned, the cutter arm 4 is connected to the upper end of the central shaft 5 and a clutch collar 17 is secured to the lower end of shaft 5. Clutch collar 17 includes an upper clutch half 18 and a lower clutch half 19 and a central section 20 which is located between the clutch halves 18 and 19. The clutch collar 17 is adapted to be moved vertically, and when the clutch collar is in its uppermost position, the upper clutch half 18 will be in engagement with a clutch member 21 secured to the fixed inner sleeve 15.

When the clutch collar 17 is moved to its lowermost position, the lower clutch half 19 will engage a clutch member 22 which carries a gear segment 23 having a series of teeth 24. The teeth 24 of the gear segment 23 are engaged with the teeth 25 on a rack 26 secured to a piston rod 27 which extends between a pair of hydralic cylinders 28 and 29. When hydraulic fluid is introduced into the cylinder 28 the piston rod 27 will be moved in the direction of the solid arrow in FIG. 5 and the rack 26 will be correspondingly moved. Movement of the rack will pivot the gear segment 23 about the axis of shaft 5 and pivotal movement of segment 23 acts through the clutch member 22 to rotate the clutch collar 17 and thereby rotate the central shaft 5 and the cutter arm 4. Thus, when the clutch collar 17 is in its lowermost position, movement of the piston rod 27 in the direction of the solid arrow will rotate the central shaft 5 and the cutter arm 4 through a small increment or arc.

To move the clutch collar 17 between the upper or disengaged position, the central or neutral position and the lower or engaged position, a yoke 30 is located between the peripheral edge portions of the upper and lower clutch halves 18 and 19 in alignment with central section 20. To move the yoke 30 in a vertical stroke, a series of cylinders 31 are secured to the lower surface of the yoke and the piston rods 32 of cylinders 31 extend through openings 33 in the yoke and are secured to the fixed inner sleeve 15. With this construction, the piston rods 32 are fixed and the cylinders 31 and the attached yoke 30 can move relative to the rods 32 when hydraulic fluid is introduced into the cylinders. For example, when fluid is introduced into the lower end of the cylinders 31, the cylinders 31 and the attached yoke 30 will move downwardly with relation to the rods 32 to move the lower clutch half 19 into engagement with the clutch member 22. Conversely when fluid is introduced into the upper end of the cylinders 31, the cylinders and yoke will move upwardly to bring the upper clutch half 18 into engagement with the fixed clutch member 21 to thereby lock the cutter arm against rotation.

In operation, the clutch collar 17 is initially in its lowermost position to thereby engage the central shaft 5 with the gear segment 23, and as fluid is introduced into the cylinder 28 to move the rod 27 and rack 26 in the direction of the solid arrow, the gear segment 23 will be pivoted through an arc which in turn will pivot the shaft 5 and the cutter arm 4. When the piston rod 27 reaches the end of its stroke fluid is introduced into the upper ends of the cylinders 31 to thereby move the yoke 30 and clutch collar 17 upwardly and engage the upper clutch half 18 with the fixed clutch member 21 to lock the central shaft 5 and cutter arm 4 against rotation. In this position the lower clutch half 19 is disengaged with the clutch member 22 so that fluid can be introduced into the cylinder 29 to move the piston rod 27 in its return stroke, as shown by the dashed arrow in FIG. 5. When the piston has finished its return stroke fluid is introduced into the opposite end of cylinders 31 to move the yoke 30 and clutch collar 17 downwardly, which causes the lower clutch half 19 to engage the clutch member 22 associated with gear segment 23. With the clutch collar again in the lowermost position, movement of the piston rod 27 in the direction of the solid arrow will again pivot the drive shaft 5 and cutter arm 4, through a second increment or arc. This operation is continued and serves to move the cutter arm through a series of small increments or arcs around the silo.

In addition to sprocket 12 the outer sleeve 13 also carries a sprocket 34 and the conveying mechanism 8 includes an endless chain 35 which is trained over the sprocket 34 as well as over a sprocket 36 which is located on the exterior of the silo. The chain 35 carries a series of paddles 37 which serve to convey the dislodged silage within the trough 7 to the exterior of the silo. As best shown in FIG. 2, a housing 38 is removably secured to the wall of the silo in alignment with the trough 7 and is provided with a spring loaded door 39. Paddles 37 convey the silage from the central portion of the trough outwardly into the housing 38 where the silage falls from the door 39 and can be collected in a suitable wagon or container.

The operation of the conveyor chain 35 serves as the drive mechanism for the cutter chain 6. The conveyor chain 35 rotates the sprocket 34 and as sprocket 34 and sprocket 12 are both secured to the outer sleeve 13, rotation of the sprocket 34 will serve to rotate sprocket 12 and thereby drive the cutter chain 6 in its endless path.

To drive the conveyor chain 35, the sprocket 36 is secured to a vertical shaft 40 and the upper end of the shaft carries a gear 41 which is engaged with a pinion 42 carried by shaft 43. Shaft 43 is coupled to the drive shaft 44 of a hydraulic motor 45 which is mounted above the housing 38. Hydraulic fluid is supplied to the hydraulic motor by a pump 46 which is operated by an electric motor 47. The suction line of the pump 48 extends downwardly into a reservoir 49 which is formed centrally within the housing 38. The hydraulic fluid under pressure is discharged by the pump, and distributed not only to the hydraulic motor, but also to the drive cylinders 28 and 29 and the clutch cylinders 31, as will be described hereafter.

The reservoir 49 is located between the paths of travel of the endless conveyor chain 35 and is defined by a pair of walls 50 which extends parallel to the side walls of the housing 38 and a pair of transverse walls 51 which are connected to the side walls 50. With this construction the reservoir is located centrally of the housing 38 and the conveyor chain 35 travels within the passages 52 defined by the walls 50 and the side walls 53 of the housing 38.

The hydraulic system is shown diagrammatically in FIG. 7. The pump 46 includes a series of pistons each of which is connected to a discharge line. As shown in FIG. 7 the pump includes five pistons the positions of which are indicated by A, B, C, D and E. The discharge lines from pistons A, B, C and D are connected to the hydraulic motor 45 while the discharge from the piston E is employed to drive the cutter arm 4.

A discharge line 54 is connected to piston A and communicates with a supply line 55 which is connected to the hydraulic motor 45. Check valve 56 is located within line 54 and permits the flow of hydraulic fluid toward the motor 45 and prevents the flow in the opposite direction.

A dump valve 57 is connected by line 58 to discharge line 54 and a pilot pressure line 59 also connects valve 57 to line 54 on the opposite side of check valve 56. The dump valve 57 is loaded to a predetermined pressure and when the pressure of the fluid in line 54 exceeds this value, valve 57 will open to discharge the fluid through line 60 to the reservoir 49.

The piston B is connected by discharge line 61 to supply line 55 and check valve 62 is located in line 61. A dump valve 63, similar in construction to dump valve 57, is connected by line 64 to discharge line 61 and a pilot pressure line 65 also connects the dump valve to line 55. The dump valve 63 is also responsive to a predetermined pressure in line 61 which is substantially higher than the pressure setting for the dump valve 57. When the pressure exceeds the setting for valve 63 the valve 63 will open and the fluid from line 61 will flow through the valve and through return line 66 to the reservoir 49.

The third piston C is connected by discharge line 67 to supply line 55 so that the fluid will flow through line 67 at all times to the hydraulic motor 45.

The piston D is connected by discharge line 68 to supply line 55 which leads to the hydraulic motor 45, and check valve 69 is located in line 68. A valve 70, similar to valves 57 and 63, is connected by line 71 to line 68 and a pilot pressure line 72 is connected to the valve on the opposite side of the check valve 69. The dump valve 70 is responsive to a predetermined pressure in line 68 which is substantially higher than the pressure settings of valves 57 and 63. When the pressure in lines 68 exceeds the preset value valve 70 will open and the fluid within line 68 can flow through the valve and through return line 73 to the reservoir 49.

As a safety measure, a pressure relief valve 74 is connected to line 55 and is set for a pressure value higher than the settings of valve 57, 63 and 70. When the pressure in line 55 exceeds the setting of pressure relief valve 74, valve 74 will open to discharge the fluid through a return line 75 to reservoir 49.

As previously mentioned, the fluid is directed through line 55 to the hydraulic motor 45 to operate the motor and fluid is returned from the motor through line 76 to the reservoir 49. To reverse the operation of the hydraulic motor 45 and thereby reverse the travel of the cutter chain 6 as well as the conveyor chain 35, a manually operated reverse flow valve 77 is connected in the lines 55 and 76. By manually operating the valve 77, the flow of fluid to motor 45 will be reversed so that the motor will operate in the opposite direction.

The hydraulic system automatically varies the speed of the cutter chain in accordance with the load on the cutter chain. For example, if the hydraulic fluid is being supplied from all four pistons A, B, C and D to the hydraulic motor 45 the speed of the motor will be at a maximum. The pressure settings of the valves 57, 63 and 70 are set at various levels, as for example, the pressure setting for valve 57 can be 750 p.s.i., the setting for valve 63 1500 p.s.i., and the setting for valve 70 2250 p.s.i., while the relief valve 74 may be set for a pressure setting of 3200 p.s.i. As the load on the cutter chain 5 increases, the pressure of the hydraulic fluid correspondingly increases and when the pressure exceeds the 750 p.s.i. the setting of valve 57, the valve will open and the hydraulic fluid will then flow through the valve to the reservoir 49. When this occurs hydraulic fluid is then only being supplied through pistons B, C and D to the hydraulic motor and the speed of the motor will be three-fourths of its maximum speed. If the load increases further and the pressure of the hydraulic fluid exceeds the setting of valve 63, valve 63 will then open to bypass the hydraulic fluid to the reservoir. When the valve 63 opens, hydraulic fluid will then be supplied to the motor 45 through only the pistons C and D and the speed of the motor will be one-half that of its maximum speed. Simiarly, if the pressure of the hydraulic fluid increases to a value above the setting of dump valve 70, valve 70 will open, bypassing the fluid to the reservoir and this results in fluid only being supplied from piston C to the hydraulic motor. The speed then will be one-fourth of the maximum speed. Thus the construction provides an automatic variation in speed of the hydraulic motor in accordance with variations of the load. As the load increases the speed will be reduced and conversely as the load decreases the speed of the cutter chain will be increased.

While the hydraulic system shown above has a series of four pistons A, B, C and D which supply hydraulic fluid to the motor 45, it is contemplated that any number of pistons can be used with the gerater number of pistons providing the greater incremental variation in speed for the motor under varying load conditions.

As previously mentioned, the piston E of pump 46 supplies hydraulic fluid for operation of the cutter arm 4 and a discharge line 78 is connected between the piston E and one end of the clutch cylinder 31, while the opposite end of the clutch cylinder 31 is connected by line 79 to the reservoir 49. Line 80 connects the supply line 78 with the cylinder 28 and a check valve 81 is connected in line 80. In addition, a bypass line 82 is connected between line 78 and 80 across the check valve 81 and a sequence valve 83 is located in line 82. Similarly, a line 84 connects the line 79 to the other cylinder 29 and a check valve 85 is connected in line 84. Bypass line 86 is connected between lines 79 and 84 across the valve 85 and a sequence valve 87, similar to valve 83, is located in line 86.

In operation, hydraulic fluid is supplied through piston E of pump 45 and through line 78 to the left end of cylinder 31, as shown in FIG. 7, which moves the clutch collar 17 to the lower position to engage the clutch half 19 with the clutch member 22. When the pressure in line 78 builds up beyond a predetermined value after the piston of cylinder 31 has completed its movement, valve 83 will open and the hydraulic fluid will then flow through line 80 to the cylinder 28.

The pressure of the fluid in the cylinder 28 will move the piston rod 27 and the attached rack to thereby move the gear segment 23 and the cutter arm 4 in a short increment or stroke. When the piston rod 27 reaches the end of its stroke the pressure will build up within cylinder 28 and when the pressure in cylinder 28 and line 80 builds up to a predetermined value the pressure control valve 88 which is connected to line 80 will open to discharge fluid from line 80 through line 89 to reservoir 49. The pressure of the fluid in line 89 actuates a pressure sensing unit 90 which transmits a signal through pilot pressure line 91 to switching valve 92 to reverse the position of valve 92 and thereby change the direction of flow of fluid to the cylinder 31. Reversing the position of valve 92 will cause the fluid to flow to the right-hand side of the cylinder 31, as shown in FIG. 7, through line 79. When the stroke is completed and the pressure builds up in the right-hand end of the cylinder 31 and valve 87 will open to permit fluid to flow through line 84 to cylinder 29. The fluid in cylinder 29 will thereby return the piston rod 27 to its original position. When the return stroke of piston 27 has been completed, the pressure buildup in line 84 will open the pressure control valve 93 to discharge the fluid through line 94 to the reservoir. The pressure of the fluid in line 94 actuates a pressure sensing unit 95 which transmits a signal through pilot pressure line 96 to switching valve 92 to thereby return the valve 92 to its original position. With the valve 92 in its original position the fluid will flow through line 78 to the left-hand side of the cylinder 31 as shown in FIG. 7. The flow of fluid to this end of the cylinder will again serve to engage the clutch collar with the gear segment and after the cylinders 31 have completed their strokes of movement the pressure buildup in line 78 will cause the valve 81 to open to thereby supply fluid through line 80 to cylinder 28. The supply of fluid to cylinder 28 will again move the piston rod 27 in the outward stroke to move the gear segment 23 as well as the drive shaft 5 and cutter arm 4 in a second increment of movement. This procedure is repeated to thereby rotate the cutter arm in a series of short intermittent strokes.

A provision is made to stop the rotational movement of the cutter arm 4 while maintaining operation of the cutter chain 6, by locating an on-off valve 97 in the lines 78 and 79.

In addition, the direction of rotation of the cutter arm can be reversed by operation of a manual reversing valve 98 which is located in lines 78 and 79 between the switching valve 92 and the cylinder 31.

As a safety measure a pressure relief valve 99 is connected to line 78 and if the pressure exceeds a maximum preset value, the valve 99 will open to vent the fluid through line 100 to the reservoir 49. The pressure setting of pressure relief valve 99 is substantially higher than that of valves 88 and 93 so that the valve 99 will not open under normal operating conditions but only under extreme conditions of pressure increase.

The unloading mechanism of the invention utilizing the hydraulic drive system has distinct advantages over a mechanical drive system. With the hydraulic drive the speed of travel of the cutter chain is automatically varied with the variations in the load conditions. For example, as the load increases when the cutter chain engages a hard packed area, the speed will decrease, and as the load decreases the speed of travel of the cutter chain will increase. This not only reduces the power requirements but increases the overall delivery rate of the unloader.

The cutter arm is rotated around the axis of central post 5 in a series of short intermittent strokes. During the periods between strokes the arm is locked against rotation. Locking of the cutter arm between strokes prevents the backup of the arm by reaction when the cutter chain engages a mass of hard packed silage.

As a further advantage the path of travel of the cutter chain 6 as well as the rotational movement of the cutter arm 4 can be individually reversed. This enables the cutter arm and the cutter chain to be backed up if a very hard packed silage is encountered and this again increases the delivery efficiency of the unit. Moreover, the cutter arm 4 can be rotated independently of the operation of the cutter chain 6 and the conveyor chain 35.

The cushioning effect of the hydraulic drive also reduces the shock loads on the unloader and substantially increases the service life of the unloading mechanism.

Various modes of carrying out the invention are contemplated as being within the scope of the following claims particularly pointing out and distinctly claiming the subject matter which is regarded as the invention.

I claim:

1. A mechanism for unloading stored material from a storage structure, comprising a vertical shaft journalled at the center of the structure, an arm secured to the shaft and extending outwardly to a location adjacent the wall of the structure, said arm including means for dislodging the stored material, conveying means for conveying dislodged material to the exterior of the structure, hydraulic means operably connected to said shaft for rotating the shaft through an arc of a circle, means for operating said hydraulic means at periodic intervals to thereby rotate said shaft through said arc and correspondingly rotate said arm around the axis of said shaft, and means for locking the shaft against rotation at times between said periodic intervals.

2. A mechanism for unloading stored material from a storage structure, comprising a vertical shaft journaled at the center of the structure, an arm secured to the shaft and extending outwardly to a location adjacent the wall of the structure, said arm including means for dislodging the stored material and moving the stored material toward the center of the structure, conveying means for conveying dislodged material to the exterior of the structure, hydraulic means for oscillating the shaft about the axis of said shaft, clutch means for selectively engaging the shaft with said hydraulic means when said shaft is moved in one direction in its oscillating path of movement and for disengaging the shaft and said hydraulic means when the shaft is moved in the opposite direction in its oscillating path of travel, and second hydraulic means operably connected to the clutch means for moving the clutch between the engaged and disengaged positions.

3. A mechanism for unloading a stored material from a storage structure, comprising a material dislodging arm journaled for rotation about the center of the structure and adapted to dislodge the material and move said material toward the center of the structure, conveying means for conveying the dislodged material to the exterior of the structure, a drive member, hydraulic means for driving the drive member in an oscillating path of movement, a fixed locking member, clutch means selectively engageable with the drive member and with said locking member, and second hydraulic means for engaging said clutch means with the drive member when the drive member is moved in one direction in its oscillating path of movement and for engaging the drive member with said locking member when the drive member is moved in the opposite direction in its oscillating path of travel.

4. In an apparatus for unloading stored material from a storage structure, a material dislodging arm extending from adjacent the center of the structure to the periphery thereof, a vertical shaft secured to the inner end of the arm and mounted for rotation at the center of the structure, a hydraulic cylinder located adjacent the center of the structure, piston means movable in a reciprocating stroke of travel in said cylinder, a drive member operably connected to said piston means, and means for connecting the drive member to the shaft prior to the stroke of the piston means in one direction and for disengaging the drive member from said shaft prior to the stroke of the piston means in the opposite direction.

5. In an apparatus for unloading stored material from a storage structure, a material dislodging arm extending from adjacent the center of the structure to the periphery thereof, a vertical shaft secured to the inner end of the arm and mounted for rotation at the center of the structure, a hydraulic cylinder located adjacent the center of the structure, piston means movable in a reciprocating stoke of travel in said cylinder, a drive member operably connected to the piston means and mounted for oscillating movement about the axis of said shaft, and clutch means for engaging the drive member with the shaft when the piston means is moved in one direction in its reciprocating stroke of travel and for disengaging the drive means from said shaft when the piston means is moved in the opposite direction in its reciprocating stroke of travel.

6. In an apparatus for unloading stored material from a storage structure, a material dislodging member extending from adjacent the center of the structure to the periphery thereof, a vertical shaft secured to the inner end of the member and mounted for rotation at the center of the structure, a first hydraulic cylinder located adjacent the center of the structure, piston means movable in a reciprocating stroke of travel in said cylinder, a drive member operably connected to the piston means and mounted for oscillating movement about the axis of the shaft, clutch means for engaging the drive member with the shaft when the piston means is moved in one direction in its reciprocating stroke of travel and for disengaging the drive means from said shaft when the piston means is moved in the opposite direction in its reciprocating stroke of travel, a second hydraulic cylinder located adjacent the center of the structure, and second piston means mounted for movement in said second cylinder and operably connected to said clutch means for engaging and disengaging said clutch means.

7. In a storage structure, a base to support the storage structure and having a trough extending from the center of the base to the periphery thereof, a material dislodging arm extending from adjacent the center of the base to the periphery thereof and located above said base, a vertical shaft secured to the inner end of the arm and mounted for rotation in the trough at the center of the structure, a hydraulic cylinder located within the trough adjacent the center of the structure, piston means movable in a reciprocating stroke of travel in said cylinder, an oscillating drive member operably connected to said piston means, and means for connecting the drive member to the shaft prior to the stoke of the piston means in one direction and for disengaging the drive member from said shaft prior to the stroke of the piston means in the opposite direction.

8. A storage structure, comprising a vessel to contain a stored material, a base to support the vessel and having a trough in the upper surface extending from the center of the vessel to the exterior, a material dislodging arm journaled for rotation at the center of the vessel and adapted to rotate within the vessel to dislodge the material and move the dislodged material toward the center of the structure, a housing secured to the outer surface of the vessel and disposed in alignment with the outer end of the trough, an endless conveyor mounted within the trough and within the housing for moving the dislodged material to the exterior of the vessel, hydraulic drive means operably connected to said arm and to said conveyor for rotating the arm and driving the conveyor, said hydraulic drive means including a reservoir for hydraulic fluid located within said housing.

9. The structure of claim 8, in which the endless conveyor moves in spaced paths of travel in said housing and the reservoir is located within the housing between the spaced paths of travel.

10. The structure of claim 8, in which the hydraulic drive means includes a pump located on the upper surface of the housing and having an intake conduit extending downwardly to the reservoir within the housing.

11. A mechanism for unloading stored material from a storage structure, comprising an arm journalled for rotation at the center of the structure and including a cutter chain mounted for endless travel on said arm and disposed to dislodge the stored material, conveying means for conveying the dislodged material to the exterior of the structure, hydraulic drive means operably connected to said arm, said cutter chain and said conveying means for driving the same, and means operably connected to the hydraulic drive means for automatically increasing the speed of travel of said cutter chain in accordance with a decrease in load on said cutter chain and for automatically decreasing the speed of travel of said cutter chain in accordance with an increase in load on said cutter chain.

12. In an unloading mechanism for unloading a stored material from a storage structure, an arm mounted for rotation about the center of the structure, material dislodging means carried by the arm for dislodging the stored material as the arm is rotated in the structure, a hydraulic drive system for said dislodging means and including a reservoir for hydraulic fluid, pumping means and a drive member operably connected to said dislodging means, said pumping means having an inlet connected to said reservoir and having a series of discharge outlets connected by discharge lines to said drive member, and valve means in each discharge line with each valve means having a different pressure setting and arranged to by-pass hydraulic fluid to the reservoir when the pressure of fluid in the discharge line exceeds the pressure setting of the corresponding valve means, the pressure of the fluid in said discharge lines varying in accordance with the load on said dislodging means, and said valve means serving to successively bypass fluid to the reservoir as the pressure of the fluid progressively increases to thereby reduce the speed of said drive member and said dislodging means.

13. In an unloading mechanism for unloading a stored material from a storage structure, an arm mounted for rotation about the center of the structure, material dislodging means carried by the arm for dislodging the stored material as the arm is rotated in the structure, a hydraulic drive system for said dislodging means and including a reservoir for hydraulic fluid, pumping means and a drive member operably connected to said dislodging means, said pumping means having an inlet connected to said reservoir and having a series of discharge outlets connected by discharge lines to said drive member, and means in each discharge line for diverting fluid from said discharge line to the reservoir when the pressure of said fluid in said discharge line exceeds a given pressure, the given pressure of at least two of said discharge lines being substantially different to successively bypass fluid to the reservoir as the pressure of the fluid progressively increases to thereby reduce the speed of said drive member and said dislodging means.

14. In an unloading mechanism for unloading a stored material from a storage structure, an arm mounted for rotation about the center of the structure, material dislodging means carried by the arm for dislodging the stored material as the arm is rotated in the structure, a hydraulic drive system for said dislodging means and including a reservoir for hydraulic fluid, pumping means and a drive member operably connected to said dislodging means, said pumping means having an inlet connected to said reservoir and having a series of discharge outlets connected by discharge lines to said drive member, a valve in at least one of said discharge lines, a bypass line connecting the valve and the reservoir, said valve being responsive to a given pressure setting and characterized by the ability to close said discharge line and bypass fluid through said bypass line to the reservoir when the pressure of the fluid in the discharge line exceeds said given pressure, the pressure of the fluid in said discharge lines varying in accordance with the load on said dislodging means, and said valve serving to bypass fluid to the reservoir as the pressure of the fluid progressively increases to thereby reduce the speed of said drive member and said dislodging means.

15. In an unloading mechanism for unloading a stored material from a storage structure, an arm mounted for rotation about the center of the structure, material dislodging means carried by the arm for dislodging the stored material as the arms is rotated in the structure, a hydraulic drive system for said dislodging means and including a reservoir for hydraulic fluid, pumping means, first drive member operably connected to said arm and a second drive member operably connected to said dislodging mean, said pumping means having an inlet connected to said reservoir and having a series of outlets connected by discharge lines, a first of said discharge lines connected to said first drive member and a second plurality of said discharge lines connected to said second drive member, a valve connected in at least one of said plurality of discharge lines, a bypass line connecting each valve and the reservoir, said valve each being responsive to a given and different pressure characterized by the ability to close the corresponding discharge line and open said bypass line when the pressure of the fluid exceeds the respective pressure, the pressure of the fluid in said discharge lines varying in accordance with the load on said dislodging means and said valves serving to successively bypass fluid to the reservoir as the pressure of the fluid increases to thereby reduce the speed of said second drive member and said dislodging means.

16. In an unloading mechanism for unloading a stored material from a storage structure, an arm mounted for rotation about the center of the structure, material dislodging means carried by the arm for dislodging the stored material as the arm is rotated in the structure, drive means operably connected to said dislodging means to drive the same, means responsive to an increase in load on said dislodging means and operably connected to said drive means for decreasing the speed of operation of said dislodging means, and means responsive to a decrease in load on said dislodging means and operably connected to said drive means for increasing the speed of operation of said dislodging means.

References Cited

UNITED STATES PATENTS

| | | | |
|---|---|---|---|
| 2,563,622 | 8/1951 | Scott. | |
| 2,755,942 | 7/1956 | Broberg | 214—17 |
| 3,088,606 | 5/1963 | Schaefer | 214—17 |
| 3,237,788 | 3/1966 | Weaver et al. | 214—17 |

ROBERT G. SHERIDAN, *Primary Examiner.*

U.S. Cl. X.R.

198—213, 95